United States Patent
Durant

(10) Patent No.: US 12,490,962 B2
(45) Date of Patent: Dec. 9, 2025

(54) CONTROLLING A SURGICAL SYSTEM USING A FOOTSWITCH

(71) Applicant: Alcon Inc., Fribourg (CH)

(72) Inventor: Daniel Durant, Rancho Santa Margarita, CA (US)

(73) Assignee: Alcon Inc., Fribourg (CH)

( * ) Notice: Subject to any disclaimer, the term of this patent is extended or adjusted under 35 U.S.C. 154(b) by 933 days.

(21) Appl. No.: 17/377,448

(22) Filed: Jul. 16, 2021

(65) Prior Publication Data

US 2022/0022852 A1 Jan. 27, 2022

Related U.S. Application Data

(60) Provisional application No. 63/055,587, filed on Jul. 23, 2020.

(51) Int. Cl.
*A61B 17/00* (2006.01)
*A61B 34/00* (2016.01)
(Continued)

(52) U.S. Cl.
CPC .............. *A61B 17/00* (2013.01); *A61B 90/20* (2016.02); *A61B 90/30* (2016.02); *A61F 9/00781* (2013.01); *A61F 9/0079* (2013.01); *A61F 9/008* (2013.01); *A61B 2017/00973* (2013.01); *A61B 17/28* (2013.01); *A61B 17/3201* (2013.01);
(Continued)

(58) Field of Classification Search
CPC ..... A61B 17/00; A61B 17/28; A61B 17/3201; A61B 90/20; A61B 90/30; A61B 2017/00973; A61B 2017/00977; A61B 2034/742; A61B 2090/365; A61B 3/132; A61B 3/13; A61B 3/102; A61B 34/70; A61B 34/74; A61B 34/25; A61F 9/00781;
(Continued)

(56) References Cited

U.S. PATENT DOCUMENTS 8,177,394 B2  5/2012 Butler
8,584,994 B2  11/2013 Butler
(Continued)

OTHER PUBLICATIONS

Centurion Vision System Footswitch, LuxOR Microscope Foot Controller, Alcon Research Ltd.—Class II Permissive Change https://device.report/fccid/vmcngpfsw1 (dated 2014).

*Primary Examiner* — Travis S Fissel
(74) *Attorney, Agent, or Firm* — PATTERSON + SHERIDAN, LLP

(57) ABSTRACT

An ophthalmic surgical system comprises a surgical microscope that provides a field of view of a surgical site to a user. A microscope display device displays a graphical overlay and the field of view. The graphical overlay displays fields to adjust configurable settings that modify operation of a surgical instrument. A footswitch receives user input from the user to adjust the configurable settings by: detecting a first movement of a joystick by the user, the first movement representing movement of a cursor relative to the fields; and detecting a second movement of the joystick or a button by the user, the second movement representing a selection of a field. The computer: generates a control signal to adjust the configurable settings in the response to the user input; and outputs the control signal to the surgical instrument to adjust the configurable settings according to the user input.

21 Claims, 7 Drawing Sheets

(51) Int. Cl.
  *A61B 90/00* (2016.01)
  *A61B 90/20* (2016.01)
  *A61B 90/30* (2016.01)
  *A61F 9/007* (2006.01)
  *A61F 9/008* (2006.01)
  *A61B 17/28* (2006.01)
  *A61B 17/3201* (2006.01)

(52) U.S. Cl.
  CPC ... *A61B 2034/742* (2016.02); *A61B 2090/365* (2016.02)

(58) Field of Classification Search
  CPC .... A61F 9/0079; A61F 9/008; A61F 9/00736; G02B 21/0012; G02B 21/368
  USPC ........ 351/205, 245, 246; 600/318, 561, 573, 600/310; 606/27, 107, 4, 5
  See application file for complete search history.

(56) References Cited

U.S. PATENT DOCUMENTS

| | | | |
|---|---|---|---|
| 8,970,959 B2 | 3/2015 | Butler | |
| D743,036 S | 11/2015 | Boukhny | |
| 11,963,728 B2* | 4/2024 | Schrader | A61B 1/00042 |
| 2006/0236242 A1 | 10/2006 | Boukhny | |
| 2008/0284725 A1* | 11/2008 | Logue | G06F 3/011 |
| | | | 345/156 |
| 2013/0169412 A1 | 7/2013 | Roth | |
| 2017/0165114 A1* | 6/2017 | Hallen | A61F 9/00736 |
| 2017/0196453 A1* | 7/2017 | Papac | A61B 3/10 |
| 2017/0258637 A1 | 9/2017 | Seiler | |
| 2017/0280989 A1 | 10/2017 | Heeren | |
| 2018/0132958 A1* | 5/2018 | Jochinsen | A61B 34/74 |
| 2019/0099226 A1* | 4/2019 | Hallen | A61B 34/10 |
| 2019/0354201 A1 | 11/2019 | Rapoport | |
| 2019/0361592 A1 | 11/2019 | Zieger et al. | |

* cited by examiner

CONTROLLING A SURGICAL SYSTEM USING A FOOTSWITCH

CROSS-REFERENCE TO RELATED APPLICATIONS

This application claims the benefit of priority of U.S. Provisional Patent Application Ser. No. 63/055,587 titled "CONTROLLING A SURGICAL SYSTEM USING A FOOTSWITCH," filed on Jul. 23, 2020, which is hereby incorporated by reference in its entirety as though fully and completely set forth herein.

TECHNICAL FIELD

The present disclosure relates generally to surgical systems, and more particularly to controlling a surgical system using a footswitch.

BACKGROUND

An ophthalmic surgical system may include a surgical microscope, a surgical console, and surgical instruments. The surgical microscope is used to view a surgical field, such as a patient's eye. A user may perform a surgical procedure by inserting the surgical instruments into the eye and manipulating the instruments while viewing the surgical field through the surgical microscope. The surgical instruments have operating settings, such as an intraocular pressure, cut speed, or illumination level, which are typically controlled on the surgical console itself. For example, dials, knobs, or a graphical user interface (GUI) on the console are used to change these settings.

Changing a setting during the surgical procedure can be distracting. For example, the user may need to look up from the microscope, move to the console, and manually change the setting on the console. Alternatively, the user may call out what change they want to an assistant, who must then manually change the setting on the console. Such processes of changing settings introduce inefficiencies into the surgical workflow. Rather than maintaining focus on the surgical field, the user's attention is diverted to the surgical console or assistant.

BRIEF SUMMARY

In certain embodiments, an ophthalmic surgical system comprises a surgical microscope, a surgical instrument, a microscope display device, a footswitch, and a computer. The surgical microscope provides a field of view of a surgical site to a user. The surgical instrument performs a surgical task at the surgical site. The microscope display device is in communication with the surgical microscope. The microscope display device displays a graphical overlay and the field of view including the surgical instrument. The graphical overlay displays fields to adjust configurable settings that modify operation of the surgical instrument. The footswitch comprises a joystick and buttons. The footswitch receives user input from the user to adjust the one or more configurable settings associated with the surgical instrument by: detecting a first movement of the joystick by the user, the first movement representing movement of a cursor relative to the fields of the graphical overlay; and detecting a second movement of the joystick or a button by the user, the second movement representing a selection of a field of the graphical overlay entered by the user. The computer: generates a control signal to adjust the one or more configurable settings that modify the operation of the surgical instrument in the response to the user input entered using the graphical overlay; and outputs the control signal to the surgical instrument to control the surgical instrument to adjust the one or more configurable settings according to the user input entered using the graphical overlay Embodiments may include none, one, some, or all of the following features:

The surgical instrument comprises an illumination device. A field of the plurality of fields displayed by the graphical overlay comprises an illuminator field to adjust illumination of the illumination device. The computer outputs the control signal to the illumination device to adjust illumination of the illumination device according to the user input. The footswitch may: detect the first movement of the joystick representing movement of the cursor to the illuminator field; and detect the second movement of the joystick or the button by the user, the second movement representing a selection of an option of the illuminator field as the user input.

The surgical instrument comprises a vitrectomy probe. A field of the plurality of fields displayed by the graphical overlay comprises a vitrectomy field to adjust the one or more configurable settings of the vitrectomy probe. The computer outputs the control signal to the vitrectomy probe to adjust the configurable settings of the vitrectomy probe according to the user input. The footswitch may: detect the first movement of the joystick representing movement of the cursor to the vitrectomy field; and detect the second movement of the joystick or the button by the user, the second movement representing a selection of an option of the vitrectomy field as the user input.

The surgical instrument comprises a laser probe. A field of the plurality of fields displayed by the graphical overlay comprises a laser probe field to adjust the one or more configurable settings of the laser probe. The computer outputs the control signal to the laser probe to adjust the configurable settings of the laser probe according to the user input. The footswitch may: detect the first movement of the joystick representing movement of the cursor to the laser probe field; and detect the second movement of the joystick or the button by the user, the second movement representing a selection of an option of the laser probe field as the user input.

The surgical instrument comprises a phacoemulsification ultrasound probe. A field of the plurality of fields displayed by the graphical overlay comprises a phacoemulsification field to adjust the one or more configurable settings of the phacoemulsification ultrasound probe. The computer outputs the control signal to the phacoemulsification ultrasound probe to adjust the configurable settings of the phacoemulsification ultrasound probe according to the user input. The footswitch may: detect the first movement of the joystick representing movement of the cursor to the phacoemulsification field; and detect the second movement of the joystick or the button by the user, the second movement representing a selection of an option of the phacoemulsification field as the user input.

The ophthalmic surgical system comprises a fluidics system configured to manage intraocular pressure (IOP). A field of the plurality of fields displayed by the graphical overlay comprises a fluidics field to adjust the one or more configurable settings of the fluidics system. The computer outputs the control signal to the fluidics system to adjust the configurable settings of the fluidics system according to the user input. The footswitch may: detect the first movement of the joystick representing movement of the cursor to the fluidics field; and detect the second movement of the joystick or the button by the user, the second movement representing a selection of an option of the fluidics field as the user input.

The surgical instrument comprises a diathermy probe. A field of the plurality of fields displayed by the graphical overlay comprises a diathermy field to adjust the one or more configurable settings of the diathermy probe. The computer outputs the control signal to the diathermy probe to adjust the configurable settings of the diathermy probe according to the user input. The footswitch may: detect the first movement of the joystick representing movement of the cursor to the diathermy field; and detect the second movement of the joystick or the button by the user, the second movement representing a selection of an option of the diathermy field as the user input.

The surgical instrument comprises scissors. A field of the plurality of fields displayed by the graphical overlay comprises a scissors field to adjust the one or more configurable settings of the scissors. The computer outputs the control signal to the scissors to adjust the configurable settings of the scissors according to the user input. The footswitch may: detect the first movement of the joystick representing movement of the cursor to the scissors field; and detect the second movement of the joystick or the button by the user, the second movement representing a selection of an option of the scissors field as the user input.

The surgical instrument comprises forceps. A field of the plurality of fields displayed by the graphical overlay comprises a forceps field to adjust the one or more configurable settings of the forceps. The computer outputs the control signal to the forceps to adjust the configurable settings of the forceps according to the user input. The footswitch may: detect the first movement of the joystick representing movement of the cursor to the forceps field; and detect the second movement of the joystick or the button by the user, the second movement representing a selection of an option of the forceps field as the user input.

A field of the plurality of fields displayed by the graphical overlay comprises a footswitch field to adjust the one or more configurable settings of the footswitch. The computer outputs the control signal to the footswitch to adjust the configurable settings of the footswitch according to the user input. The footswitch may: detect the first movement of the joystick representing movement of the cursor to the footswitch field; and detect the second movement of the joystick or the button by the user, the second movement representing a selection of an option of the footswitch field as the user input.

In certain embodiments, a method for an ophthalmic surgical system comprises: providing, by a surgical microscope, a field of view of a surgical site to a user; performing, by a surgical instrument, a surgical task at the surgical site; displaying, by a microscope display device, a graphical overlay and the field of view including the surgical instrument, the graphical overlay displaying a plurality of fields to adjust one or more configurable settings that modify operation of the surgical instrument; receiving, by a footswitch comprising a joystick and plurality of buttons, user input from the user to adjust the one or more configurable settings associated with the surgical instrument by: detecting a first movement of the joystick by the user, the first movement representing movement of a cursor relative to the fields of the graphical overlay; and detecting a second movement of the joystick or a button by the user, the second movement representing a selection of a field of the graphical overlay entered by the user; generating, by a computer, a control signal to adjust the one or more configurable settings that modify the operation of the surgical instrument in the response to the user input entered using the graphical overlay; and outputting, by the computer, the control signal to the surgical instrument to control the surgical instrument to adjust the one or more configurable settings according to the user input entered using the graphical overlay.

DESCRIPTION OF EXAMPLE EMBODIMENTS

Figure 1:
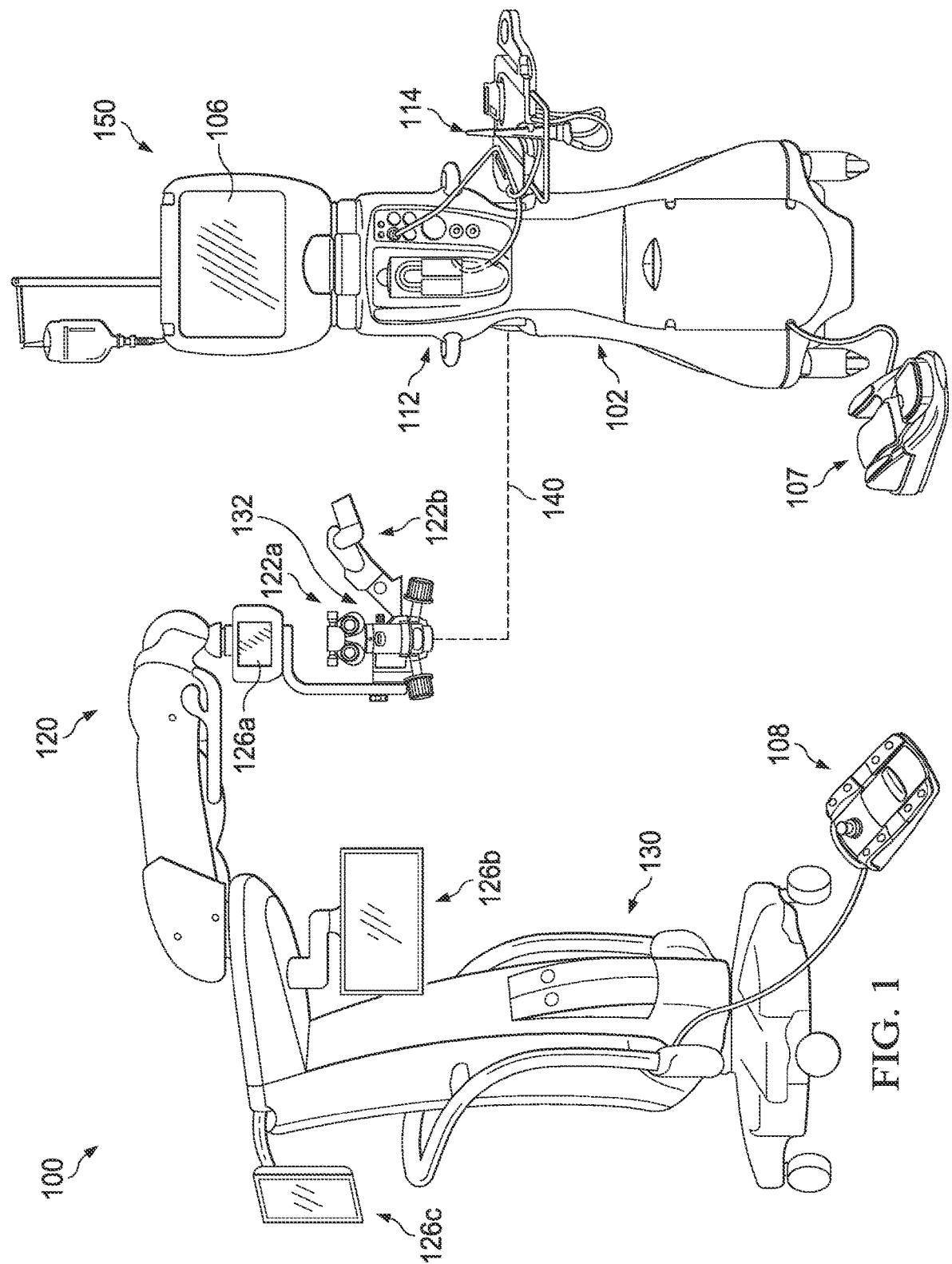
FIG. 1 illustrates an example of an ophthalmic surgical system.

Referring now to the description and drawings, example embodiments of the disclosed apparatuses, systems, and methods are shown in detail. It will be understood that no limitation of the scope of the disclosure is intended. The description and drawings are not intended to be exhaustive or otherwise limit the claims to the specific embodiments shown in the drawings and disclosed in the description. Although the drawings represent possible embodiments, the drawings are not necessarily to scale and certain features may be simplified, exaggerated, removed, or partially sectioned to better illustrate the embodiments. Any modifications to and any further application of the apparatuses, systems, and methods, of the present disclosure are fully contemplated as would normally occur to one skilled in the art. For example, it is fully contemplated that features (e.g., components or steps) described with reference to one or more implementations may be combined with features described with reference to other implementations.

The present disclosure relates generally to apparatuses, systems, and methods for using a footswitch to adjust settings of a surgical instrument via a graphical overlay presented simultaneously with a microscope field of view. A user may perform a surgical procedure by manipulating the surgical instrument in an eye while viewing the surgical field through the microscope. The graphical overlay provides a graphical user interface (GUI) that may be used to control settings of the surgical instrument. The user may use the footswitch to provide user input to select the settings via the GUI.

The apparatuses, systems, and methods provide numerous advantages. The efficiency of surgical procedures may be improved by reducing the steps to change a setting. For example, a user may change the setting without relying on an assistant or moving away from the microscope. The safety of surgical procedures may also be improved by allowing the user to maintain focus on the surgical field while changing the setting.

FIG. 1 illustrates an example of an ophthalmic surgical system 100. The system 100 includes a surgical microscope 120 in communication with a surgical console 150 along a communication path 140, coupled as shown. The system 100 may be used for any suitable ophthalmic procedure, e.g., an anterior segment procedure, posterior segment procedure, vitreoretinal procedure, vitrectomy procedure, cataract procedure, and/or other surgical procedure.

The surgical microscope 120 provides a field of view of the surgical site to a user, and may be a compound, stereo, or digital microscope. In the illustrated example, the surgical microscope 120 includes a support or frame 130, microscope display devices 126 (which include eyepieces 122), optical train housing 132, and a footswitch 108, coupled as shown. Light reflected from an eye travels through the optical train housing 132, optionally through an imaging device, to the display devices 126. A graphical overlay with a GUI for adjusting settings for one or more surgical instruments is provided into the optical path of the surgical microscope 120 to allow the user to simultaneously view the surgical field and graphical overlay. In general, a graphical overlay is an image of graphical elements that is displayed simultaneously with the field of view in a manner that still makes visible important portions of the field of view.

The optical train housing 132 includes one or more optical components (e.g., lenses, mirrors, filters, gratings, and/or other elements) that allow the user to view the surgical field. The optical train housing 132 may also include optical components for directing the light reflected from the patient eye into separate optical pathways for each of the eyepieces 122.

The microscope display devices 126 are in communication with the surgical microscope 120 to display the field of view to a user while the user, e.g., performs a surgical task with a surgical instrument. One or more microscope display devices 126 also display the graphical overlay to adjust the surgical instrument settings. The microscope display devices 126 include eyepieces 122 (122a, 122b). In some instances, one of the eyepieces 122a, 122b may be used by a primary user (e.g., a surgeon or other medical professional), and the other eyepiece 122b, 122a may be used by a secondary user (e.g., an assistant or other medical professional).

The microscope display devices 126 (126a, 126b, 126c) includes screens fixedly or removably coupled to the surgical microscope 120. In the illustrated example, display devices include a heads-up display 126a. The surgical microscope 120 may include an imaging device that captures the view as observed by the user via the eyepieces 122 and directs the view, along with the graphical overlay, to the screens. The display devices 126 may also display configurable operating settings, medical information about the eye, and/or an image (e.g., optical coherence tomography (OCT), fluorescein angiography, indocyanine green angiography, fundus photography, slit lamp biomicroscopy, and/or other suitable image) of the eye.

A footswitch 108 of surgical microscope 120 has foot-actuated controls. The user may use the footswitch 108 to select operating settings via the GUI of the graphical overlay. The footswitch 108 is described in more detail with reference to FIGS. 4A and 4B. In certain embodiments, the user may use additional input devices (e.g., a display, touchscreen, keyboard, mouse, gesture sensor, microphone, and speakers) to provide input.

The surgical console 150 provides functionality for surgical instruments and systems to perform surgical tasks. In the illustrated example, the surgical console 150 includes a base housing 102, a surgical instrument control system 112, a hand-held surgical instrument 114, a footswitch 107, and a console screen 106, coupled as shown. The surgical instrument control system 112 may control operation of the surgical instrument 114 in response to input from the user. The surgical instrument 114 is a hand-held device that may be inserted into the eye to perform a surgical task. Examples of a surgical instrument 114 include a cutting probe, a vitrectomy probe, a phacoemulsification probe, a laser probe, an ablation probe, a vacuum probe, a flushing probe, scissors, forceps, an endoscopic visualization probe, other ophthalmic devices, and/or combinations thereof. The surgical instrument 114 may have configurable operating settings. An operating setting is a parameter with a value that may be selected by a user (e.g., a surgeon, medical technician, or other medical professional).

The console screen 106 is a display device that may display information related to the surgical procedure, such as information that may be displayed by the microscope display devices 126.

Figure 2:
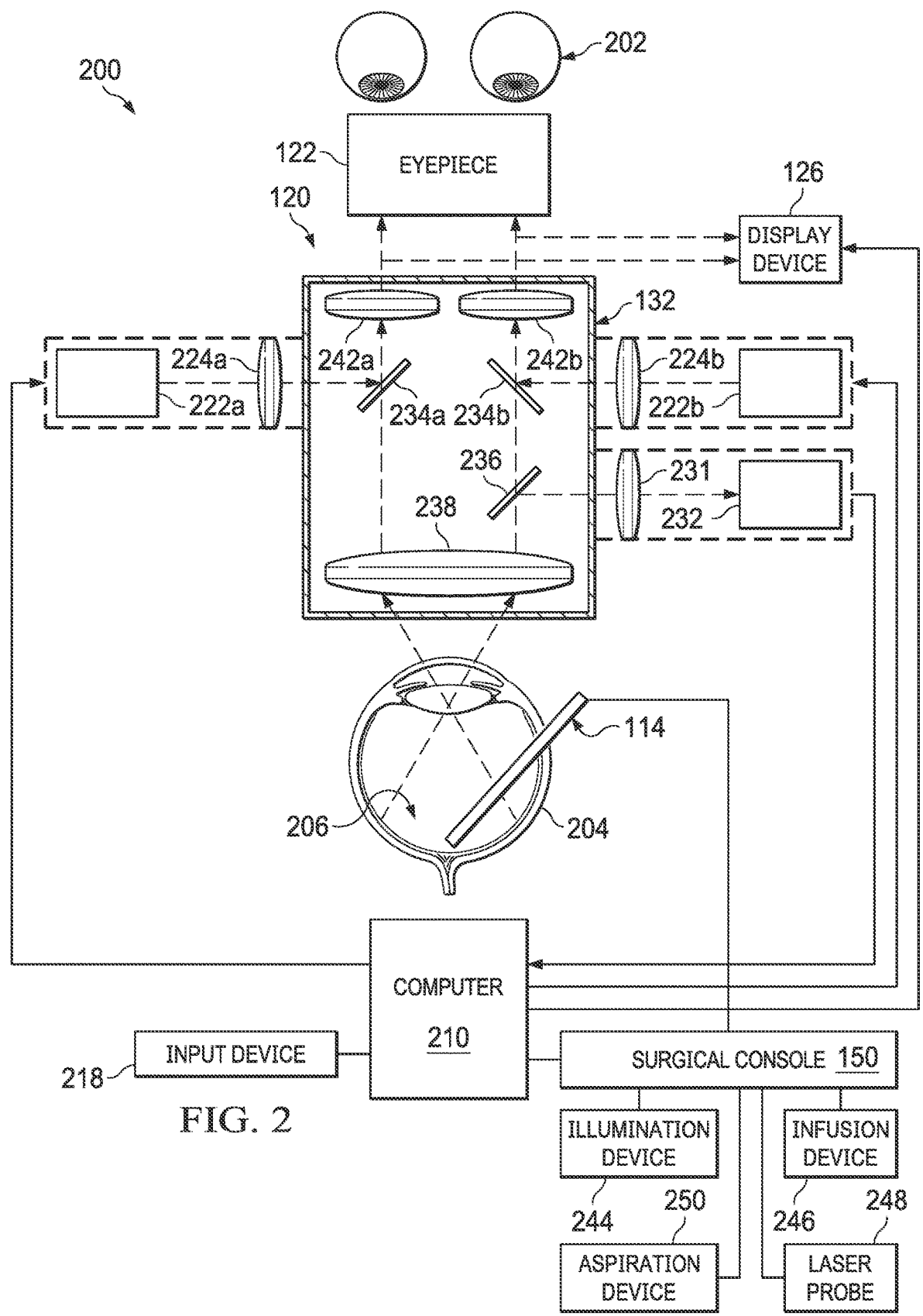
FIG. 2 illustrates parts of a microscope system that may be implemented by the ophthalmic surgical system of FIG. 1.

FIG. 2 illustrates examples of parts of a microscope system 200 that may be implemented by the ophthalmic surgical system 100 of FIG. 1. The system 200 includes the surgical microscope 120, the surgical console 150, a computer 210, and an input device 218, coupled as shown. A user 202 observes a surgical field 206, which includes biological tissues of an eye 204. The user 202 performs the surgical procedure using a surgical instrument 114.

The surgical microscope 120 includes an optical train housing 132, an imaging device 232, and overlay display devices 222 (222a, 222b), coupled as shown, to provide the surgical view 206 and graphical overlay to the microscope display devices 126 (including the eyepiece 122). In the illustrated example, the optical train housing 132 includes lenses 242 (242a, 242b) (such as focusing and zoom lenses), an objective lens 238, a beam splitter 236, and beam couplers 234 (234a, 234b). The beam splitter 236 guides a portion of the reflected light through a lens 231 to the imaging device 232 and allows another portion of the reflected light to pass through to the eyepiece 122 and/or another microscope display device 126. In other examples, the beam splitter 236 may be located at another suitable position, e.g., between optical train housing 132 and a microscope display device 126. The beam couplers 234a, 234b combine the light from the overlay display devices 222a, 222b, respectively, with the light reflected from the surgical field 206. The combined light, which represents the surgical view and graphical overlay, is received at the eyepiece 122 and/or another microscope display device 126.

The imaging device 232 receives light reflected from the surgical field 206 and generates a series of images, or frames, of the surgical field 206 to form a real-time view of field 206. The imaging device 232 may be a digital imaging device such as a camera with an image sensor (e.g., a charge coupled device (CCD) image sensor, complementary metal-oxide-semiconductor (CMOS) sensor, and/or other image sensor). The imaging device 232 may transmit the image data to the computer 210.

Overlay display devices 222 (222a, 222b) output a graphical overlay into the optical path of the surgical microscope 120. In the illustrated implementation, light from the overlay display devices 222a, 222b passes through lenses 224a, 224b, respectively, to the beam couplers 234a, 234b, i.e., the overlay display devices 222 correspond to the different optical paths for each eye of the user 202. In other implementations, a single display device may output a graphical overlay into both optical paths. The overlay display devices 222 may be any suitable device that provides visible images. Examples of an overlay display device 222 include a projector (e.g., a digital light processing (DLP)

device, a liquid crystal display (LCD) device, a light emitting diode (LED) device, a liquid crystal on silicon (LCoS) device).

The surgical console 150 is used to control a surgical instrument 114 during the surgical procedure. The surgical instrument 114 may be coupled to the console 150 via a conduit such that the instrument 114 and console 150 are in mechanical, electrical, pneumatic, fluid, and/other desired type of communication. In the illustrated example, the surgical instruments 114 include an illumination device 244, an infusion device 246, a laser probe 248, and/or an aspiration device 250. An illumination device 244 illuminates the surgical field 206, and may be, e.g., an ophthalmic chandelier illuminator, spot illuminator, endo-illuminator, or fiber optic illuminator. An infusion device 246 delivers fluid into the eye 204 to, e.g., maintain intraocular pressure and/or flush material from the eye 204. A laser probe 248 delivers laser light to the eye 204 to, e.g., create incisions, cauterize blood vessels during photocoagulation, and/or perform other surgical procedure. An aspiration device 250 evacuates fluid and/or biological material from the surgical field 206.

Computer 210 executes computer instructions to control the surgical instruments 114 by transmitting control signals to the instruments 114. The control signals may be generated in response to user input received via the graphical overlay to increase, decrease, and/or otherwise modify the operating settings. In certain embodiments, the computer 210 may combine the graphical overlay with the image data of the surgical field 206 and send the resulting image to display device 126.

The input device 218 allows a user to provide user input to set and/or change configurable operating settings by making selections within the GUI of the graphical overlay. In some implementations, the user input device 218 is the footswitch 108. The input device 218 may include controls (e.g., button(s), switch(es), a scroll device, or a joystick) that allow a user to provide different types of inputs, such as moving a cursor within the GUI. In some instances, each control of the user input device 218 may be mapped to specific commands to facilitate efficient selection or adjustment of operating settings.

Figure 3:
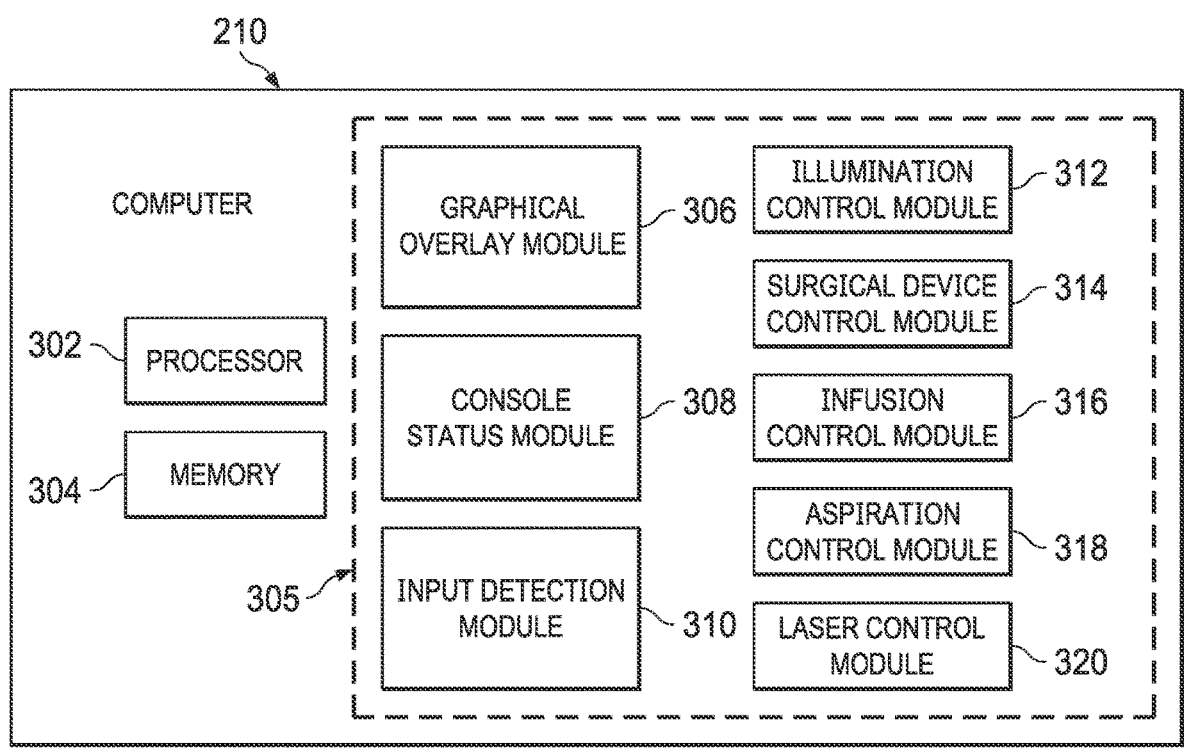
FIG. 3 is a block diagram of a computer that may be used by the ophthalmic surgical system of FIG. 1.

FIG. 3 is a block diagram of a computer 210 that may be used by the ophthalmic surgical system 100 of FIG. 1. The computer 210 includes a processing circuit, such as one or more processors 302, in communication with a memory 304. The processor(s) 302 may execute computer instructions stored on the memory 304 to allow a user to select operating settings via a graphical overlay displayed in the microscope view. The parts of computer 210 may be located at any suitable part of the system 100, e.g., at the surgical microscope 120, at the surgical console 150, at a separate component, or distributed among two or more of the previous items.

The computer 210 also includes one or more programmable processor units 305 running programmable code instructions. In the illustrated example, the programmable processor units 305 include a graphical overlay module 306, a console status module 308, an input detection module 310, an illumination control module 312, a surgical device control module 314, an infusion control module 316, an aspiration control module 318, and a laser control module 320.

The graphical overlay module 306 includes computer-executable instructions for generating display data associated with the graphical overlay and transmitting the display data to the overlay display devices 222, which output the graphical overlay into the field of view of the surgical microscope 120. The graphical overlay module 306 may also include computer-executable instructions for combining the graphical overlay data with the image data of the surgical field 206 to yield display data for a resulting image that includes both the graphical overlay and the surgical field. This display data may be sent to microscope display devices 126. In an example of operation, the graphical overlay module 306 may be located at the surgical microscope 120. The graphical overlay module 306 receives information from the surgical console 150 and overlays the information onto the surgical field view of the surgical microscope 120.

The console status module 308 includes computer-executable instructions for determining the operating status of the console and/or instruments 114. For example, the console status module 308 may receive signals from the surgical instrument 114 indicating the current operating status.

The input detection module 310 includes computer-executable instructions for determining user input used to select and/or modify one or more configurable operating settings via the graphical overlay. The input detection module 310 may be configured to recognize, e.g., footswitch button selection and/or joystick movement.

Instrument control modules (e.g., the illumination control module 312, the surgical device control module 314, the infusion control module 316, the aspiration control module 318, and/or the laser control module 320) include computer-executable instructions for generating control signals for surgical instruments 114 (e.g., the illumination device 244, surgical instrument 114, infusion device 246, aspiration device 250, and the laser probe 248, respectively). The control signals may be representative of the operating settings for the respective surgical instrument. For example, the control signals may cause activation or deactivation of a surgical instrument, functioning of the surgical instrument at a set value, an increase, decrease, other change in the operation of the surgical instrument, or may otherwise control surgical instrument operation. The computer 210 may generate and transmit the control signals in response to user inputs determined by the input detection module 310 and/or the current status of the surgical instrument 114 determined by the console status module 308.

Figure 4A:
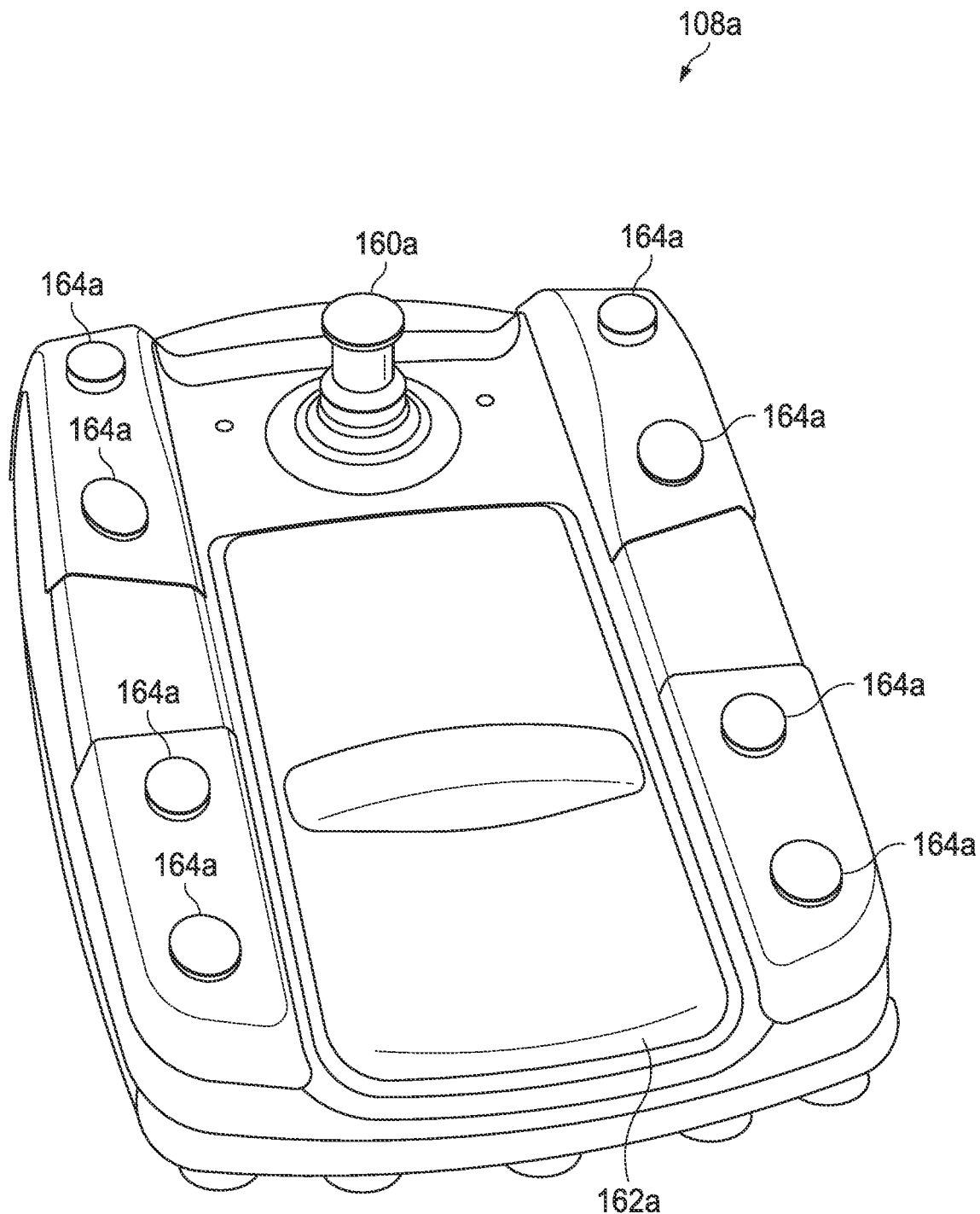
FIGS. 4A and 4B illustrate examples of a footswitch that may be used to adjust settings of a surgical instrument of the ophthalmic surgical system of FIG. 1.
Figure 4B:
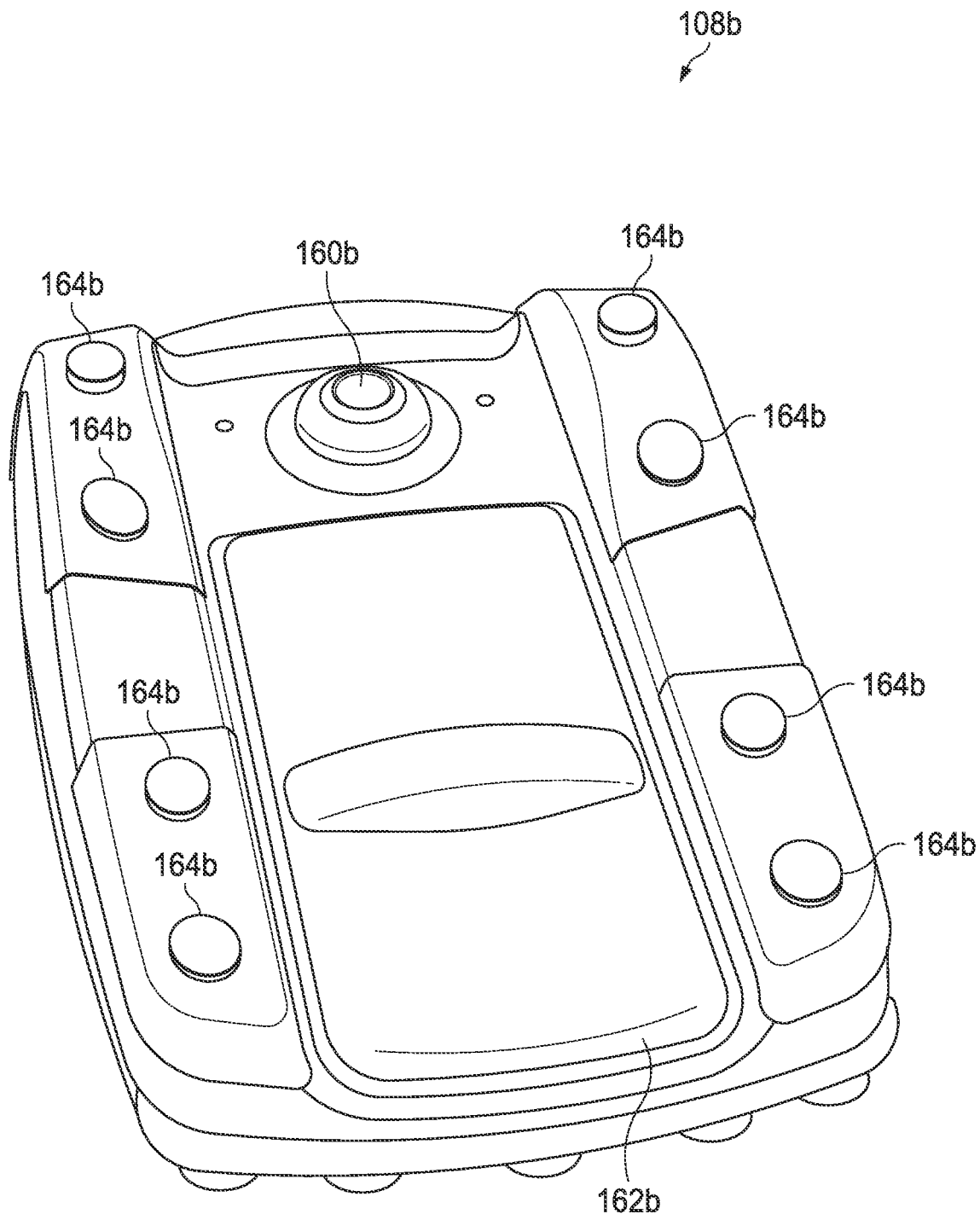

FIGS. 4A and 4B illustrate examples of a footswitch 108 (108a, 108b) that may be used to adjust settings of a surgical instrument 114 of the ophthalmic surgical system 100 of FIG. 1. In the illustrated examples, a footswitch 108 (108a, 108b) includes a joystick 160 (160a, 160b) and buttons 162 (162a, 162b), 164 (164a, 164b), where a pedal 162 (162a, 162b) is a particular type of button. A joystick 162 is a lever that a user can move in several directions to control the movement of an image on a display device 126, e.g., movement of a cursor across a screen. In the illustrated examples, the joystick 160a is a taller joystick, and the joystick 160b is a shorter joystick. In certain embodiments, another movement of the joystick 160 may be used to select an option, e.g., a user may press the joystick 160 to select an option indicated by a cursor.

Buttons 162, 164 may be used to select an option, e.g., a user may press a button 162, 164 to select an option indicated by a cursor. In some examples, the amount a pedal 162 is pressed may be used to control a variable setting. For example, a pedal 162 may be slightly pressed to select a lower value, and pressed more to select a higher value, or vice-versa. In certain embodiments, buttons 162, 164 may be mapped to specific operations, such as: (1) microscope operations (e.g., focus and/or zoom); (2) illumination operations (e.g., illumination level, turn on/off); and/or (3) system operations (e.g., operations to adjust components of system 100).

In certain embodiments, footswitch 108 receives user input from the user to adjust configurable settings associated with the surgical instrument 114. A graphical overlay may display options for the settings on a display device 126. The footswitch 108 detects a first movement of the joystick 160 by the user. The first movement represents movement of a cursor relative to the options of the graphical overlay. For example, the user can move the lever sideways, downwards, and/or upwards to control movement of the cursor across the graphical overlay. The footswitch 108 detects a second movement of the joystick 160 or a button 162, 164 by the user. The second movement represents a selection of an option of the graphical overlay entered by the user. For example, the user may press joystick 160 or a button 162, 164 to select the option indicated by the cursor. In response, the computer 210 may generate a control signal to adjust the configurable settings that modify the operation of the surgical instrument in the response to the user input entered using the graphical overlay. The computer 210 may then output the control signal to the surgical instrument to control the surgical instrument to adjust the configurable settings according to the user input entered using the graphical overlay.

Figure 5:
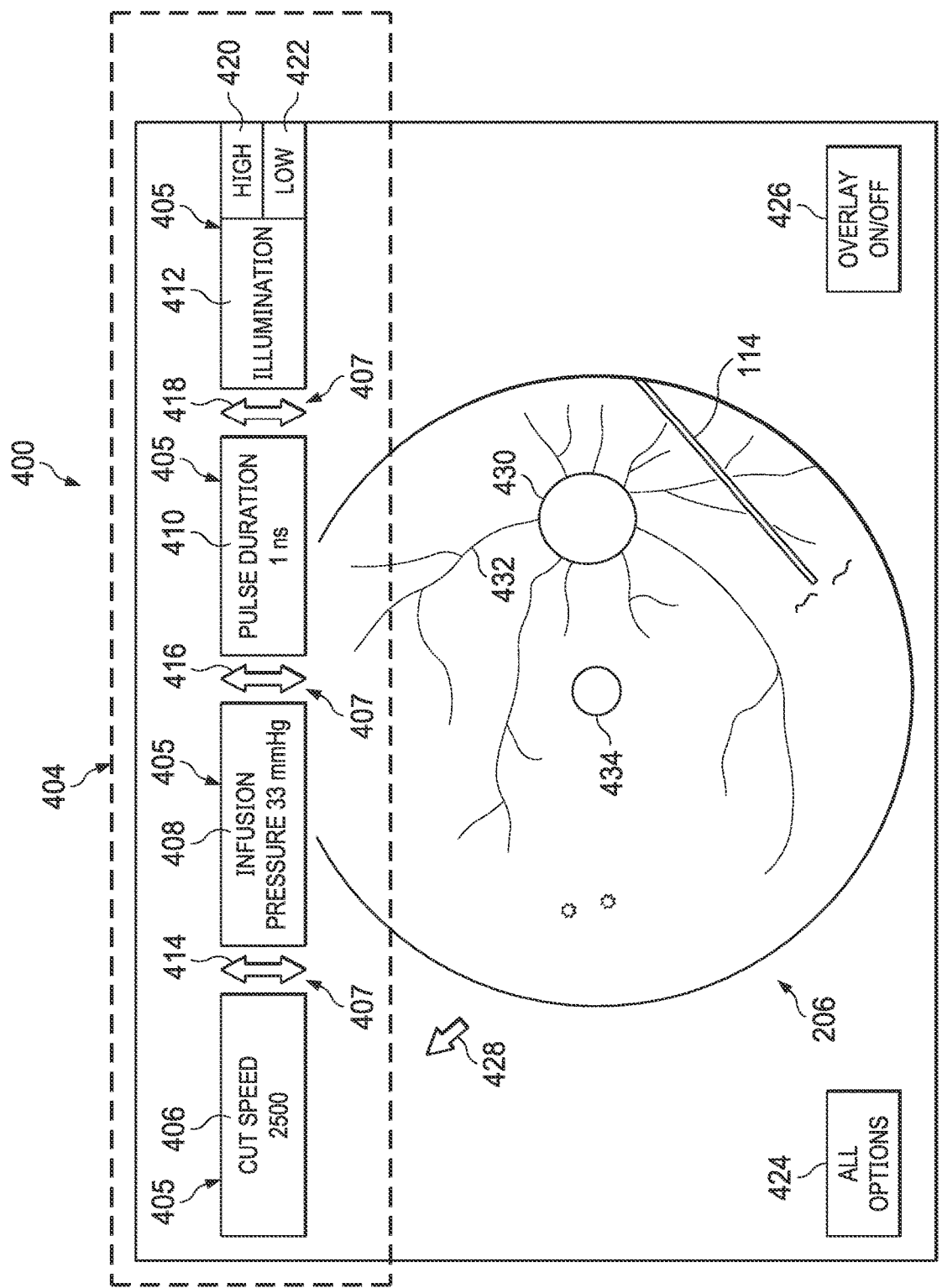
FIG. 5 illustrates an example field of view that may be seen through the surgical microscope of FIG. 1.

FIG. 5 illustrates an example field of view 400 that may be seen through the surgical microscope 120 of FIG. 1. The field of view 400 shows a surgical field 206 and a graphical overlay 404. The graphical overlay 404 includes a cursor 428, parameter fields 405, and adjustment fields 407. Parameter fields 405 provide information about configurable settings, and adjustment fields 407 can be used to change the settings.

In the illustrated example, the surgical field 206 shows the anatomy within an eye (the retina 430, blood vessel 432, and macula 434) and a surgical instrument 114. The settings of the instruments can be viewed and adjusted using the graphical overlay 404 according to input from an input device, such as a footswitch 108.

Parameter fields 405 provide any suitable setting information, which may include the name, set point, current status, and/or other suitable information about the setting. In the illustrated example, the parameter fields 405 include a cut speed set point 406, an infusion pressure set point 408, a laser pulse duration set point 410, and an illumination level set point 412. The number and nature of the parameter fields 405 may vary depending upon, e.g., the surgical procedure being performed, stage of the surgical procedure, number of instruments, or personal preferences of the user. The information may be expressed as an alphanumeric, symbolic, and/or other graphical representation, e.g., text, abbreviation, symbol, graphic, logo, numerical value, unit of measurement, and/or other content. Please note the values shown in the drawings are only example values.

A parameter field 405 has an associated adjustment field 407 that allows a user to change the settings of the field 405. In the illustrated example, adjustment field 414 is associated with the cut speed set point 406; adjustment field 416 is associated with the infusion pressure set point 408; adjustment field 418 is associated with a laser pulse duration set point 410; and adjustment fields 420, 422 are associated with an illumination level set point 412. Adjustment fields 414, 416, and 418 allow the user to increase or decrease the cut speed set point, infusion pressure set point, and/or the laser pulse duration set point, respectively. Adjustment fields 420, 422 allow a user to select a high or low illumination level set point.

The user may use the joystick of the footswitch 108 to control the cursor 428 to select one of more options of the graphical overlay 404. The user may move the cursor 428 over an adjustment field 407 and make a selection to change a set point. For example, to increase or decrease the cut speed set point 406, the user may select the up arrow or down arrow, respectively, in the adjustment field 414 using the cursor 428. In that regard, some adjustments fields may allow for scrolling between set point values (e.g., adjustment fields 414, 416, 418), while other adjustment fields allow for selection among a list of set point options (e.g., adjustment fields 420, 422). For example, the user may select between the high option 420 and the low option 422 for the illumination level set point 412.

The graphical overlay 404 may include fields for a variety of surgical instruments and systems of the ophthalmic surgical system 100. Examples are presented in items (a) to (h) below. In the examples, the graphical overlay includes a field for a particular surgical instrument or system. The footswitch 108 is configured to: detect movement of the joystick representing movement of the cursor to the field; and detect movement of the joystick or a button representing a selection of a setting of the field. The computer 210 is configured to output a control signal to the surgical instrument to adjust the setting according to the user input from the footswitch 108.

(a) Illumination. In certain embodiments, the surgical instrument is an illumination device 244, and the graphical overlay includes an illuminator field to adjust settings of the illumination device 244. The illuminator field may include one or more of the following fields: (1) an on/off field to turn the illumination device on/off; (2) an illumination level field to select a level of illumination; and/or (3) a color profile field to select a color profile for the illumination.

(b) Vitreous Cutting. In certain embodiments, the surgical instrument is a vitrectomy probe, and the graphical overlay includes a vitrectomy field to adjust settings of the vitrectomy probe. The vitrectomy field may include one or more of the following fields: (1) a duty cycle field to select a duty cycle for the vitrectomy probe; (2) a vacuum field to select a vacuum value for the vitrectomy probe; and/or (3) a cut rate field to select a cut rate for the vitrectomy probe.

(c) Laser. In certain embodiments, the surgical instrument is a laser probe 248, and the graphical overlay includes a laser probe field to adjust settings of the laser probe 248. The laser probe field may include one or more of the following fields: (1) a laser port field to select a port for use; (2) a laser status field to select the status of the probe, e.g., standby or ready; (3) a laser firing mode field to select a firing mode (e.g., single beam burst, repeated bursts, continuous beam) for the probe; (4) a laser spots field to select the number of laser spots of a multi-spot probe; (5) a power setting field to select the power of the beam of the probe; (6) a duration setting field to select the duration of the beam pulses; (7) an interval setting field to select the interval of the beam pulses; and/or (8) a turn on/off illumination field to turn on/off the probe.

(d) Phacoemulsification. In certain embodiments, the surgical instrument is a phacoemulsification ultrasound probe (phaco probe) that is used to emulsify the lens of an eye. The graphical overlay includes a phacoemulsification field to adjust settings of the phaco probe. The phacoemulsification field may include one or more of the following fields: (1) a phacoemulsification mode field to select a power mode (e.g., continuous, pulse, burst) of the probe; (2) a torsional and/or longitudinal power field to select the power in the torsional and/or longitudinal direction; (3) a pulse rate field to select the pulse rate; and/or (4) a pulse duty cycle field to select the on/off timing of the pulses.

(e) Fluidics. In certain embodiments, the ophthalmic surgical system comprises a fluidics system configured to manage intraocular pressure (IOP) via a surgical instrument. The fluidics system may increase the flow of fluid into (or irrigate) an eye to increase intraocular pressure or may aspirate fluid from the eye to decrease intraocular pressure. The graphical overlay includes a fluidics field to adjust settings of the fluidics system. The fluidics field may include one or more of the following fields: (1) an IOP control mode field to select an IOP control mode (e.g., infusion, irrigation, or air); (2) an IOP field to select the desired IOP; (3) a turn on/off field to turn on/off the infusion, irrigation, or air; (4) an aspiration vacuum field to select an aspiration vacuum value; (5) an aspiration flow field to select an aspiration flow value; (6) an aspiration mode field to select an aspiration mode (e.g., Venturi or peristaltic); (7) a reflux field to select to select a reflux setting; and/or (8) an infusion pressure field to select an infusion pressure.

(f) Diathermy. In certain embodiments, the surgical instrument is a diathermy probe, and the graphical overlay includes a diathermy field to adjust settings of the diathermy probe. The diathermy filed may include one or more of the following fields: (1) a power field to adjust the power setting; and/or (2) a mode field to select the mode (e.g., fixed or linear).

(g) Forceps. In certain embodiments, the surgical instrument is a set of forceps, and the graphical overlay includes a forceps field to adjust settings of the forceps. The forceps field may include a closing pressure field to select the closing pressure of the forceps.

(h) Scissors. In certain embodiments, the surgical instrument is scissors, and the graphical overlay includes a scissors field to adjust settings of the scissors. The scissor field may include one or more of the following fields: (1) a scissors mode field to select a cut mode (e.g., multi-cut or single cut); (2) a cut pressure field to select a cut pressure for the scissors; and/or (3) a cut rate field to select a cut rate for the scissors.

In certain embodiments, the graphical overlay 404 may include fields selectable by the footswitch 108 with options that are not related to settings for a surgical instrument. In some cases, the graphical overlay 404 may include a procedure field for a user to select the procedure type. In response, the computer 210 may present further fields related to the selected procedure type. In certain cases, the graphical overlay 404 may include a menu presentation field for a user to select the fields displayed in the graphical overlay 404. For example, an abbreviated options menu displays a specific group of operating settings, such as the most-frequently used settings or user-selected settings. As another example, an all options field 424 may be selected to display the full menu of operating settings. In response, the computer 210 may display the settings as selected by the user.

In certain embodiments, the graphical overlay 404 may include a footswitch field to display or adjust settings of the footswitch 108. For example, the footswitch filed may include: (1) a display button field to display the operations mapped to the footswitch buttons; and/or (2) a mapping field that allows a user to change the operations mapped to the footswitch buttons.

The graphical overlay 404, with the parameter fields 405 and adjustment fields 407, may have any suitable position, transparency, size, color, contrast, and/or other graphical parameter, which may be adjustable by a user. For example, the transparency of the graphical overlay 404 may be set such that the surgical field 206 is still visible through parameter fields and/or adjustment fields. In addition, the graphical elements of the graphical overlay 404 (e.g., parameter fields 405 and adjustment fields 407) may positioned in any suitable location of the field of view 400. For example, the graphical elements may be positioned surrounding the surgical field 206, such as circumferentially around the surgical field 206. One or more graphical elements may be positioned on the left side, the right side, above, and/or below the surgical field 206. In some instances, the graphical elements may be spaced apart from the view of the surgical field 206 to avoid overlapping all or a portion of the surgical field 206. In some instances, the graphical overlay 404 omits the adjustment fields 407 and integrates their functionality in the parameter fields 405. For example, the user 202 may adjust a setting by providing a user input into a window of the parameter field 405.

The graphical overlay 404 may be activated in any suitable manner. In certain embodiments, the graphical overlay 404 may be activated whenever the console 150 and/or surgical microscope 120 are operable. In other embodiments, the overlay 404 may be activated manually or automatically. For example, the field of view 400 may include an activation field 426 that a user can select (via a footswitch 108) to manually activate or deactivate the graphical overlay 404. As another example, the graphical overlay 404 may be automatically activated based on a user input and/or based on a setting or an occurrence of an event detected by the computer 210. For example, the graphical overlay 404 may be activated when the user initiates movement of the cursor 428, or may be deactivated after a time-out period.

Figure 6:
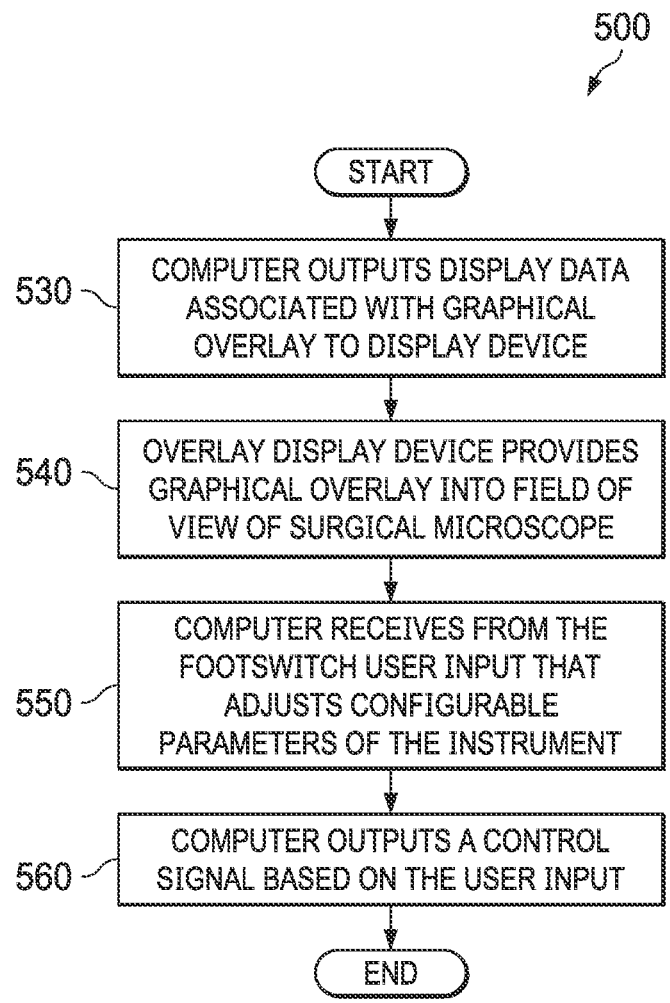
FIG. 6 is a flowchart illustrating an example method of adjusting operating settings that may be used by the ophthalmic surgical system of FIG. 1.

FIG. 6 is a flowchart illustrating an example method 500 of adjusting configurable operating settings that may be used by the ophthalmic surgical system 100 of FIG. 1. The method may be performed as a user utilizes a microscope display device to view a surgical field (e.g., a patient's eye), through a surgical microscope. The user may insert a surgical instrument (e.g., a vitrectomy probe) into the patient's eye to perform a surgical task.

The method starts at step 530, where a computer outputs display data associated with a graphical overlay to an overlay display device. The overlay display device inserts the graphical overlay into the visual path of the surgical microscope at step 540 to allow the user to view the surgical field and graphical overlay simultaneously. The graphical overlay may include a configurable setting associated with the instrument (e.g., a duty cycle of a vitrectomy probe). The graphical overlay may include a graphical representation of a set point and/or a current status of a setting and an adjustment feature (e.g., a list of options, a scroll bar, or arrow) to modify the setting.

At step 550, the computer receives from a footswitch 108 user input that adjusts a configurable setting (e.g., selects the duty cycle of the vitrectomy probe). The computer outputs a control signal based on the user input to the surgical instrument at step 560 to implement the selected setting (e.g., the control signal sets the duty cycle of the vitrectomy probe). The method then ends.

A component (such as the control computer 210) of the systems and apparatuses disclosed herein may include an interface, logic, and/or memory, any of which may include computer hardware and/or software. An interface can receive input to the component and/or send output from the component, and is typically used to exchange information between, e.g., software, hardware, peripheral devices, users, and combinations of these. A user interface (e.g., a Graphical User Interface (GUI)) is a type of interface that a user can utilize to interact with a computer. Examples of user interfaces include GUIs and input devices, e.g., a display, touchscreen, keyboard, mouse, gesture sensor, microphone, and speakers.

Logic can perform operations of the component. Logic may include one or more electronic devices that process data, e.g., execute instructions to generate output from input. Examples of such an electronic device include a computer, processor, microprocessor (e.g., a Central Processing Unit (CPU)), and computer chip. Logic may include computer software that encodes instructions capable of being executed by the electronic device to perform operations. Examples of computer software include a computer program, application, and operating system.

A memory can store information and may comprise tangible, computer-readable, and/or computer-executable storage medium. Examples of memory include computer memory (e.g., Random Access Memory (RAM) or Read Only Memory (ROM)), mass storage media (e.g., a hard disk), removable storage media (e.g., a Compact Disk (CD) or Digital Video or Versatile Disk (DVD)), database, network storage (e.g., a server), and/or other computer-readable media. Particular embodiments may be directed to memory encoded with computer software.

Although this disclosure has been described in terms of certain embodiments, modifications (such as changes, substitutions, additions, omissions, and/or other modifications) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, or the operations of the systems and apparatuses may be performed by more, fewer, or other components, as apparent to those skilled in the art. As another example, modifications may be made to the methods disclosed herein. The methods may include more, fewer, or other steps, and the steps may be performed in any suitable order, as apparent to those skilled in the art.

To aid the Patent Office and readers in interpreting the claims, Applicants note that they do not intend any of the claims or claim elements to invoke 35 U.S.C. § 112(f), unless the words "means for" or "step for" are explicitly used in the particular claim. Use of any other term (e.g., "mechanism," "module," "device," "unit," "component," "element," "member," "apparatus," "machine," "system," "processor," or "controller") within a claim is understood by the applicants to refer to structures known to those skilled in the relevant art and is not intended to invoke 35 U.S.C. § 112(f).

What is claimed:

1. An ophthalmic surgical system, comprising:
 a surgical microscope configured to provide a field of view of a surgical site to a user;
 a hand-held surgical instrument configured to perform a surgical task at the surgical site;
 a microscope display device in communication with the surgical microscope, the microscope display device configured to display a graphical overlay and the field of view including the hand-held surgical instrument, the graphical overlay displaying a plurality of fields to adjust one or more configurable settings that modify operation of the hand-held surgical instrument;
 a footswitch comprising a joystick and a pedal configured to receive a variable amount of depression from the user, the footswitch configured to receive user input from the user to adjust the one or more configurable settings associated with the hand-held surgical instrument by:
  detecting a first movement of the footswitch by the user, the first movement comprising a sideways, downwards, or upwards movement of the joystick, and wherein the first movement corresponds with movement of a cursor to at least one field of the plurality of fields of the graphical overlay, the at least one field comprising a variable setting including at least a first option and a second option; and
  detecting a second movement of the footswitch by the user, the second movement comprising a depression of the pedal such that an amount of the depression corresponds with a selection of the first option or the second option as the user input, wherein:
   the first option is selected responsive to the amount corresponding to a first amount of depression associated with the first option; and
   the second option is selected responsive to the amount corresponding to a second amount of depression associated with the second option, the second amount greater than the first amount; and
 a computer configured to:
  generate a control signal to adjust the one or more configurable settings that modify the operation of the hand-held surgical instrument in response to the user input received via the detected first and second movements of the footswitch relative to the graphical overlay; and
  output the control signal to the hand-held surgical instrument to control the hand-held surgical instrument to adjust the one or more configurable settings according to the user input received via the detected first and second movements of the footswitch relative to the graphical overlay.

2. The ophthalmic surgical system of claim 1, wherein:
the hand-held surgical instrument comprises an illumination device;
the at least one field comprises an illuminator field to adjust illumination of the illumination device;
the first option comprises a first illumination level;
the second option comprises a second illumination level greater than the first illumination level; and
the computer is configured to output the control signal to the illumination device to adjust illumination of the illumination device according to the user input.

3. The ophthalmic surgical system of claim 1, wherein:
the hand-held surgical instrument comprises a vitrectomy probe;
the at least one field comprises a vitrectomy field to adjust the one or more configurable settings of the vitrectomy probe; and
the computer is configured to output the control signal to the vitrectomy probe to adjust the configurable settings of the vitrectomy probe according to the user input.

4. The ophthalmic surgical system of claim 1, wherein:
the hand-held surgical instrument comprises a laser probe;
the at least one field comprises a laser probe field to adjust the one or more configurable settings of the laser probe; and the computer is configured to output the control signal to the laser probe to adjust the configurable settings of the laser probe according to the user input.

5. The ophthalmic surgical system of claim 1, wherein:
the hand-held surgical instrument comprises a phacoemulsification ultrasound probe;
the at least one field comprises a phacoemulsification field to adjust the one or more configurable settings of the phacoemulsification ultrasound probe; and
the computer is configured to output the control signal to the phacoemulsification ultrasound probe to adjust the configurable settings of the phacoemulsification ultrasound probe according to the user input.

6. The ophthalmic surgical system of claim 1, wherein:
the ophthalmic surgical system comprises a fluidics system configured to manage intraocular pressure (IOP);
the at least one field comprises a fluidics field to adjust the one or more configurable settings of the fluidics system; and
the computer is configured to output the control signal to the fluidics system to adjust the configurable settings of the fluidics system according to the user input.

7. The ophthalmic surgical system of claim 1, wherein:
the hand-held surgical instrument comprises a diathermy probe;
the at least one field comprises a diathermy field to adjust the one or more configurable settings of the diathermy probe; and
the computer is configured to output the control signal to the diathermy probe to adjust the configurable settings of the diathermy probe according to the user input.

8. The ophthalmic surgical system of claim 1, wherein:
the hand-held surgical instrument comprises scissors;
the at least one field comprises a scissors field to adjust the one or more configurable settings of the scissors; and
the computer is configured to output the control signal to the scissors to adjust the configurable settings of the scissors according to the user input.

9. The ophthalmic surgical system of claim 1, wherein:
the hand-held surgical instrument comprises forceps;
the at least one field comprises a forceps field to adjust the one or more configurable settings of the forceps; and
the computer is configured to output the control signal to the forceps to adjust the configurable settings of the forceps according to the user input.

10. The ophthalmic surgical system of claim 1, wherein:
the at least one field comprises a footswitch field to adjust the one or more configurable settings of the footswitch; and
the computer is configured to output the control signal to the footswitch to adjust the configurable settings of the footswitch according to the user input.

11. The ophthalmic surgical system of claim 1, wherein:
the graphical overlay further displays a procedure field to select a procedure type; and
the computer is configured to present a next field related to the selected procedure type.

12. The ophthalmic surgical system of claim 1, wherein:
the graphical overlay further displays a menu presentation field to select fields displayed in the graphical overlay; and
the computer is configured to display the selected fields in the graphical overlay.

13. A method for an ophthalmic surgical system, comprising:
providing, by a surgical microscope, a field of view of a surgical site to a user;
performing, by a hand-held surgical instrument, a surgical task at the surgical site;
displaying, by a microscope display device, a graphical overlay and the field of view including the hand-held surgical instrument, the graphical overlay displaying a plurality of fields to adjust one or more configurable settings that modify operation of the hand-held surgical instrument;
receiving, by a footswitch comprising a joystick and a pedal, user input from the user to adjust the one or more configurable settings associated with the hand-held surgical instrument by:
detecting a first movement of the footswitch by the user, the first movement comprising a sideways, downwards, or upwards movement of the joystick, and wherein the first movement corresponds with movement of a cursor to at least one field of the plurality of fields of the graphical overlay, the at least one field comprising a variable setting including at least a first option and a second option; and
detecting a second movement of the footswitch by the user, the second movement comprising a depression of the pedal such that an amount of the depression corresponds with a selection of the first option or the second option as the user input, wherein:
the first option is selected responsive to the amount corresponding to a first amount of depression associated with the first option; and
the second option is selected responsive to the amount corresponding to a second amount of depression associated with the second option, the second amount greater than the first amount;
generating, by a computer, a control signal to adjust the one or more configurable settings that modify the operation of the hand-held surgical instrument in response to the user input received via the detected first and second movements of the footswitch relative to the graphical overlay; and
outputting, by the computer, the control signal to the hand-held surgical instrument to control the hand-held surgical instrument to adjust the one or more configurable settings according to the user input received via the detected first and second movements of the footswitch relative to the graphical overlay.

14. The method of claim 13:
wherein:
the hand-held surgical instrument comprises an illumination device; and
the at least one field comprises an illuminator field to adjust illumination of the illumination device;
the first option comprises a first illumination level;
the second option comprises a second illumination level greater than the first illumination level; and
further comprising outputting the control signal to the illumination device to adjust illumination of the illumination device according to the user input.

15. The method of claim 13:
wherein:
the hand-held surgical instrument comprises a vitrectomy probe; and
the at least one field comprises a vitrectomy field to adjust the one or more configurable settings of the vitrectomy probe; and
further comprising outputting the control signal to the vitrectomy probe to adjust the configurable settings of the vitrectomy probe according to the user input.

16. The ophthalmic surgical system of claim 1, the footswitch further comprising:
- a first one or more buttons mapped to one or more operations of the surgical microscope; and
- a second one or more buttons mapped to one or more operations of the hand-held surgical instrument.

17. The ophthalmic surgical system of claim 1, the footswitch further comprising:
- a first plurality of buttons arranged in substantial alignment on the footswitch, wherein the first plurality of buttons are mapped to a first one or more operations of the ophthalmic surgical system; and
- a second plurality of buttons arranged in substantial alignment on the footswitch and substantially parallel to the first plurality of buttons, wherein the second plurality of buttons are mapped to a second one or more operations of the ophthalmic surgical system, and wherein the joystick and the pedal are positioned between the first plurality of buttons and the second plurality of buttons.

18. The ophthalmic surgical system of claim 17, wherein the first plurality of buttons are arranged on a first periphery of the footswitch and the second plurality of buttons are arranged on a second periphery of the footswitch.

19. The ophthalmic surgical system of claim 1, the footswitch further comprising:
- a first plurality of buttons arranged in substantial alignment on the footswitch, wherein the first plurality of buttons are mapped to a first one or more operations of the ophthalmic surgical system;
- a second plurality of buttons arranged in substantial alignment on the footswitch, wherein the second plurality of buttons are spaced apart from and substantially aligned with the first plurality of buttons, and wherein the second plurality of buttons are mapped to a second one or more operations of the ophthalmic surgical system;
- a third plurality of buttons arranged in substantial alignment on the footswitch and substantially parallel to the first plurality of buttons, wherein the third plurality of buttons are mapped to a third one or more operations of the ophthalmic surgical system; and
- a fourth plurality of buttons arranged in substantial alignment on the footswitch and substantially parallel to the second plurality of buttons, wherein the fourth plurality of buttons are spaced apart from and substantially aligned with the third plurality of buttons, and wherein the fourth plurality of buttons are mapped to a fourth one or more operations of the ophthalmic surgical system.

20. The ophthalmic surgical system of claim 19, wherein the joystick is positioned between the first plurality of buttons and the third plurality of buttons.

21. The ophthalmic surgical system of claim 20, wherein the pedal is positioned between the second plurality of buttons and the fourth plurality of buttons.

* * * * *